United States Patent
Nishimoto et al.

(10) Patent No.: US 10,677,917 B2
(45) Date of Patent: Jun. 9, 2020

(54) TRAFFIC MONITORING AND SURVEILLANCE SYSTEM AND METHOD, AND CORRESPONDING TRAFFIC INFRACTION RECORDING SYSTEM AND UNMANNED AIR VEHICLE

(71) Applicant: PERKONS S.A., Vila Amélia, Pinhais (BR)

(72) Inventors: Régis Eidi Nishimoto, Curitiba (BR); Eduardo Augusto Purin Schause, Curitiba (BR)

(73) Assignee: PERKONS S.A., Vila Amélia, Pinhais, PRCEP (BR)

( * ) Notice: Subject to any disclaimer, the term of this patent is extended or adjusted under 35 U.S.C. 154(b) by 455 days.

(21) Appl. No.: 15/106,018

(22) PCT Filed: Dec. 8, 2014

(86) PCT No.: PCT/BR2014/000430
§ 371 (c)(1),
(2) Date: Jun. 17, 2016

(87) PCT Pub. No.: WO2015/089600
PCT Pub. Date: Jun. 25, 2015

(65) Prior Publication Data
US 2016/0327645 A1    Nov. 10, 2016

(30) Foreign Application Priority Data
Dec. 20, 2013    (BR) .......................... 102013033041

(51) Int. Cl.
*G01S 13/92*    (2006.01)
*G01S 7/00*    (2006.01)
(Continued)

(52) U.S. Cl.
CPC ............ *G01S 13/92* (2013.01); *B64C 39/024* (2013.01); *G01S 7/003* (2013.01); *G01S 13/867* (2013.01);
(Continued)

(58) Field of Classification Search
CPC ............ B64C 39/024; B64C 2201/141; B64C 2201/146; B64C 2201/108;
(Continued)

(56) References Cited

U.S. PATENT DOCUMENTS

| | | | | |
|---|---|---|---|---|
| 4,591,823 A | * | 5/1986 | Horvat | G08G 1/052 340/466 |
| 5,952,941 A | * | 9/1999 | Mardirossian | G08G 1/052 340/539.1 |

(Continued)

FOREIGN PATENT DOCUMENTS

WO    WO 2010/081200 A1    7/2010

OTHER PUBLICATIONS

International Search Report (ISR) and Written Opinion dated Mar. 4, 2015 in PCT Application No. PCT/BR2014/000430.

*Primary Examiner* — Olumide Ajibade Akonai
(74) *Attorney, Agent, or Firm* — Knobbe, Martens, Olson & Bear LLP (57) ABSTRACT

The present invention relates to a system and method for the monitoring and surveillance of one or more vehicles (120) moving on one or more roadways (300) and to the detection and recording of images and/or videos of speeding infractions by vehicles (120) moving on the roadway (300). The invention also relates to an unmanned air vehicle (10) that carries out the method according to the invention together with a base station (80), with which it forms the system according to the invention.

14 Claims, 4 Drawing Sheets (51) Int. Cl.
*G01S 13/86* (2006.01)
*G08G 1/054* (2006.01)
*G08G 5/00* (2006.01)
*G06T 7/20* (2017.01)
*B64C 39/02* (2006.01)
*G06K 9/00* (2006.01)
*H04N 7/18* (2006.01)

(52) U.S. Cl.
CPC ....... *G06K 9/0063* (2013.01); *G06K 9/00771* (2013.01); *G06T 7/20* (2013.01); *G08G 1/054* (2013.01); *G08G 5/0069* (2013.01); *H04N 7/181* (2013.01); *B64C 2201/127* (2013.01); *G06T 2207/30232* (2013.01); *G06T 2207/30236* (2013.01)

(58) Field of Classification Search
CPC ........ B64C 2201/024; B64C 2201/027; G08G 5/0069; G08G 5/0013; G08G 5/0082; G08G 5/0078; G08G 1/052; G08G 1/0967; G01S 19/42; G01S 13/86; G01S 13/867; G01S 13/88; G01S 7/022; G01S 7/003; G01S 13/931; G01S 19/17; B60W 2550/40; B60W 30/143; H04W 4/02
See application file for complete search history.

(56) References Cited

U.S. PATENT DOCUMENTS

| | | | | |
|---|---|---|---|---|
| 6,246,948 | B1* | 6/2001 | Thakker | G08G 1/096725 123/351 |
| 6,384,740 | B1* | 5/2002 | Al-Ahmed | G08G 1/017 340/466 |
| 2003/0052797 | A1* | 3/2003 | Rock | G01C 21/3697 340/936 |
| 2008/0252487 | A1* | 10/2008 | McClellan | G01S 5/0027 340/936 |
| 2013/0158847 | A1 | 6/2013 | Teteak | |
| 2013/0338962 | A1* | 12/2013 | Crandall | G01P 13/00 702/142 |
| 2014/0336848 | A1* | 11/2014 | Saund | G08G 1/054 701/3 |

* cited by examiner

TRAFFIC MONITORING AND SURVEILLANCE SYSTEM AND METHOD, AND CORRESPONDING TRAFFIC INFRACTION RECORDING SYSTEM AND UNMANNED AIR VEHICLE

FIELD OF APPLICATION

The present invention relates to the field of traffic monitoring and surveillance and traffic infraction recording systems.

INTRODUCTION

The present invention relates to a system and method for the detection of a traffic infraction, speed measurement of the offending vehicle and recording of image and/or video of the offending vehicle. In addition, the invention relates to an unmanned aerial vehicle (UAV) capable of implementing the method according to the invention.

STATE OF THE ART

The state of the art comprises the most diverse solutions to traffic control by using devices capable of monitoring, supervising and recording infractions, given that, in recent years, there has been an increase in the use of vehicles for the implementation of these tasks, including moving vehicles and unmanned aerial vehicles.

For instance, US patent document US 2010/0328140 discloses a traffic surveillance system using a Doppler radar consisting of a system which comprises three Doppler antennas for detection and recording of vehicle images. It provides for the installation of the surveillance system next to the highway or embedded in an unmanned aerial vehicle, wherein this possibility of using it embedded is only mentioned, lacking sufficient description.

On the other hand, US patent document US 2010/0291876 discloses a traffic surveillance system using a Doppler radar consisting of a system which comprises three Doppler antennas for detection and calculation of vehicle speed. It provides for the installation of the surveillance system next to the highway or embedded in an unmanned aerial vehicle, wherein this possibility of using it embedded is only mentioned, lacking sufficient description—just as the case of US patent document US 2010/0328140.

Both US 2010/0328140 and US 2011/0291876 neither disclose nor describe the verification and eventual update of the maximum speed allowed on the monitored section wherein the possible offending vehicle is found, for the validation of the reference value and the subsequent validation of the infraction; let alone deal with monitoring and surveillance in sections having variable speed limits, especially in the transition regions between said sections. In addition, those documents don't mention the compensation of the measured speed with respect to the speed of the unmanned aerial vehicle.

Document DE 10 2005 002 278 discloses a method of land surveillance and aircraft for the implementation thereof, wherein said unmanned aerial vehicle monitors the terrain with a camera, comparing each new image taken to previous or preprogrammed situations, sending alarms when the situation of the new image differs from the previous or preprogrammed image. There isn't the description or disclosure of the verification and subsequent validation of the maximum speed permitted on the monitored section, let alone of the monitoring and surveillance in sections having variable speed limits, especially in the transition regions between said sections.

In addition, DE 10 2005 002 278 also doesn't mention the compensation of the measured speed with respect to the speed of the unmanned aerial vehicle.

Document CN102436738 discloses a traffic monitoring device based on an unmanned aerial vehicle, capable of detecting an infraction of speeding, wherein the monitored vehicle speed is calculated by analyzing the amount of frames or camera frames; that is, it does not have the proper precision for measuring speed reliably enough to serve as the basis for a document of infraction. Also, CN102436738 does not disclose how the information of the speed limit that delimits monitoring is obtained, therefore, being intended to attainment of traffic information and retrieval of video, but not to electronic monitoring itself. There isn't the description of the monitoring and surveillance in sections having variable speed limits, let alone of any form of compensation of measured speed with respect to the speed of the unmanned aerial vehicle.

As can be inferred from the description of the state of the art, there is both room and demand for traffic monitoring and surveillance improved with an unmanned aerial vehicle in connection with a base station, especially with regard to (i) detection and validation of the maximum speed allowed on the monitored section, (ii) consideration of sections having variable speed limits along the same trajectory and (iii) compensation of measure speed with respect to the speed of the unmanned aerial vehicle.

OBJECTIVES OF THE INVENTION

Therefore, one of the objectives of the invention is a system according to the features of independent claim 1. Another objective of the invention is a method according to the features of independent claim 10. Further details of these features and/or additional features are represented by the corresponding dependent claims.

BRIEF DESCRIPTION OF THE DRAWINGS

For a better understanding and viewing of the object of the present invention, the latter will now be described with reference to the attached figures representing the technical effect obtained by means of an exemplary embodiment, not to be considered limiting as to the scope of the present invention, wherein schematically.

NUMERICAL REFERENCES OF THE FIGURES

10 unmanned aerial vehicle;
20 self-propelled device;

30 detector and speed meter;
40 camera(s),
50 embedded central unit;
50a central processing unit (CPU);
50b embedded storage device;
50c embedded database;
50d embedded map
60 GPS;
70 signal transmission and reception device;
80 base station;
90 control module;
100 storage device;
110 signal transmission and reception device;
120 vehicle (s);
300 roadway or ground;
310 signpost;
Dp perception, reaction and braking distance;
$V_D$ ground speed;
$V_{Dx}$ speed vector decomposed on the x-axis;
$V_{Dy}$ speed vector decomposed on the y-axis;
$V_V$ vehicle speed;
α relative angle;
x imaginary axis; and
y imaginary axis.

DETAILED DESCRIPTION OF THE INVENTION

Background of the Invention

The detection of a traffic infraction, as well as the offending vehicle speed measurement and registration of image and/or video of the offending vehicle, follows, essentially, the following steps:

1st step: localization—definition of the physical location where monitoring and surveillance occur, with the determination of an address, limits etc.;

2nd step: detection—detection of an allegedly offending vehicle on the physical location stipulated, able to be performed, for example, by means of inductive loops, laser, radars (Doppler and the like), video (OCR), piezoelectricity etc.;

3rd step: measurement—measurement of the speed of the vehicle detected in space, which is usually performed by calculating the fraction between a distance travelled and time spent to make it based on the measurements obtained, for example, by means of inductive loops, laser, radars (Doppler and the like), video (OCR), piezoelectricity etc.;

4th step: comparison—comparison between the speed value obtained in the measurement step and the permitted value and respective tolerances, this step being the determination of the trigger, 5th step: capture—record of infraction by capturing an image or sequence of images by means, for example, of cameras and/or camcorders or other image recording means suitable for the service;

6th step: storage—pooling of information essential to the characterization of the infraction, for example, date, time, location, measured speed, speed limit, etc., with encryption of such information or not and, finally, storage of pooled data into a suitable memory medium; and 7th step: transmission—sending pooled data to a monitoring center, police force, and/or a body which is competent and responsible for processing infractions.

It is to be noted that the above-mentioned steps relate to a fundamental or basic sequence and only illustrate, in a brief and non-limiting way, a method of traffic monitoring and surveillance and traffic infraction recording known to the state of the art and usually employed in the vast majority of such systems.

Therefore, briefly, a method of traffic monitoring and surveillance and traffic infraction recording comprises the steps of localization, detection, measurement, comparison, capture, storage and transmission.

Several combinations and additions of the steps described above are possible, such as, for example, in the case of the 5th step, in which capture can be performed regardless of the outcome of the 4th step, proceeding to the remaining steps, transmitting said pooled data and leaving data evaluation, data re-evaluation, consideration of special cases, exceptions etc. for a later time (and/or over the receiver of the data).

Taking into account all the foregoing considerations, there is the universe of application of the system and method according to the present invention.

System

Figure 1:
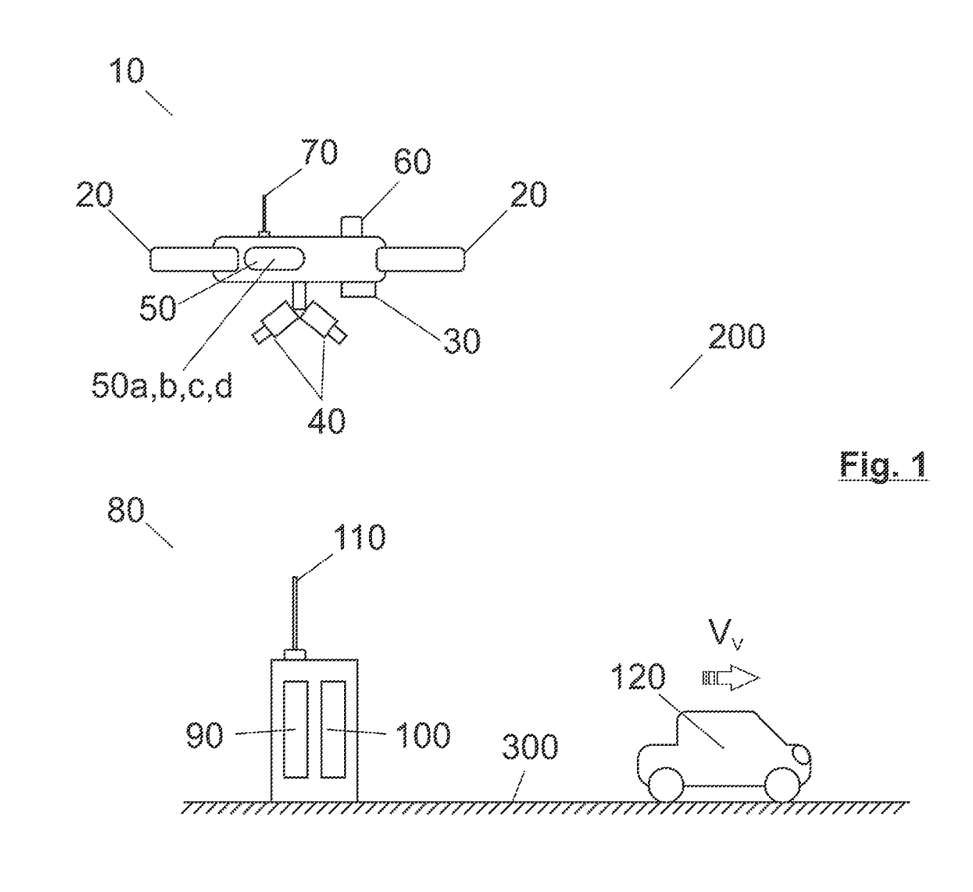
FIG. 1: presents a diagrammatic view of a system according to the invention, inserted in a monitoring environment including airspace, a roadway on the ground and a vehicle to be monitored.

In a preferred embodiment of the invention, represented in a non-limiting manner by FIG. 1, the system according to the invention is provided with an unmanned aerial vehicle (10) and a base station (80), wherein said unmanned aerial vehicle (10) moves in the airspace (200) and the base station (80) is on the ground (300).

The unmanned aerial vehicle (10) is provided with one or more self-propelled devices (20), at least one detector and speed meter (30), one or more cameras (40), an embedded central unit (50), at least one device provided with a global positioning system or GPS (60) and at least one signal transmission and reception device (70).

Self-propelled devices (20) allow for the support and the drag of the unmanned aerial vehicle (10) and its positioning within the airspace (200).

The detector and speed meter (30) is a tracking sensor (tracking antenna), preferably Doppler-type, which detects the vehicle (120) and calculates its relative speed ($V_{MED}$) and displacement direction at a given point of the roadway (300), below the location of the unmanned aerial vehicle (10).

One or more cameras (40) are responsible for the capture of images/videos of the vehicle (120), wherein said cameras are stabilized, preferably, by one or more balancers or gimbals, to ensure the capture of legible images/videos of the vehicle (120).

The embedded central unit (50) is provided with a central processing unit or CPU (50a), an embedded storage device (50b), eventually an embedded database (50c) and eventually an embedded map (50d).

The central processing unit or CPU (50a) controls the detector and speed meter (30), the camera (s) (40), GPS (60), the signal transmission and reception device (70), and also executes the method object of this patent.

The embedded storage device (50b) temporarily stores the images/videos of vehicles (120) captured by the cameras (40), the database of speeds regulated by location and vector maps of the roadways (300) to be surveilled in the unmanned aerial vehicle (10). The images/videos remain in this embedded storage device (50b) up until transmission to the base station (80) or to the collection of the embedded storage device itself (50b) when the unmanned aerial vehicle (10) is on the ground.

The device provided with global positioning system or GPS (60) allows for the determination of the location, ground speed ($V_D$) and the direction of the unmanned aerial vehicle (10) within the airspace (200), in a manner known in the state of the art.

The speed meter (30) or tracking sensor or tracking antenna, in turn, makes the correlation between the position of the unmanned aerial vehicle (10) and the position of the vehicle (120) for the purposes of determining the location (1st step of exemplary method above) that, in the case of an unmanned aerial vehicle (10) is, just like 4th step, obviously variable.

The signal transmission and reception device (70) enables communication between the unmanned aerial vehicle (10) and the base station (80), in a manner known in the state of the art.

The base station (80) is provided with at least one control module (90), at least one storage device of images and/or video (100) and at least one signal transmission and reception device (110).

The base station (80), in turn, is preferentially on the ground (300), given that, depending on the type of application, the base station (80) can be found over a base vehicle (not represented).

The base station (80) is provided with access to a remote central database (online update) and may also have a database in its physical structure (periodic update). In its physical structure, said central database or data bank contains and provides, among others, relevant traffic information including information on the maximum speeds permitted by sections, maps and other related information.

In turn, the control module (90) remotely performs the operation of flight of the unmanned aerial vehicle (10), being responsible for the programming of that flight, or even instantaneous control of the trajectory of the unmanned aerial vehicle (10), in a manner known in the state of the art.

The storage device of images and/or video (100) stores the images/videos of vehicles captured by unmanned aerial vehicle (10) in the base station (80), in a manner known in the state of the art.

The unmanned aerial vehicle (10) is controlled/monitored remotely from the base station (80) and maintained within the airspace (200) that is defined, for example, by legal and/or functional provisions and/or the autonomy and/or the range of signal transmission and reception devices (70, 110), as known in the state of the art.

The system consisting of unmanned aerial vehicle (10) and base station (80) serves to the monitoring and surveillance of one or more vehicles (120) moving on one or more roadways (300), thus, said system serving to the activity of detection and recording of image and/or video of speeding infractions by vehicles (120) moving on said monitored roadway (300).

Method

In a preferred embodiment of the invention, the monitoring and surveillance of the speed of a vehicle (120) on a roadway (300) aim at monitoring the speed of the vehicle (120) and the subsequent and eventual capture of image and/or video of said vehicle (120) should an infraction occur, i.e. speeding.

Figure 2:
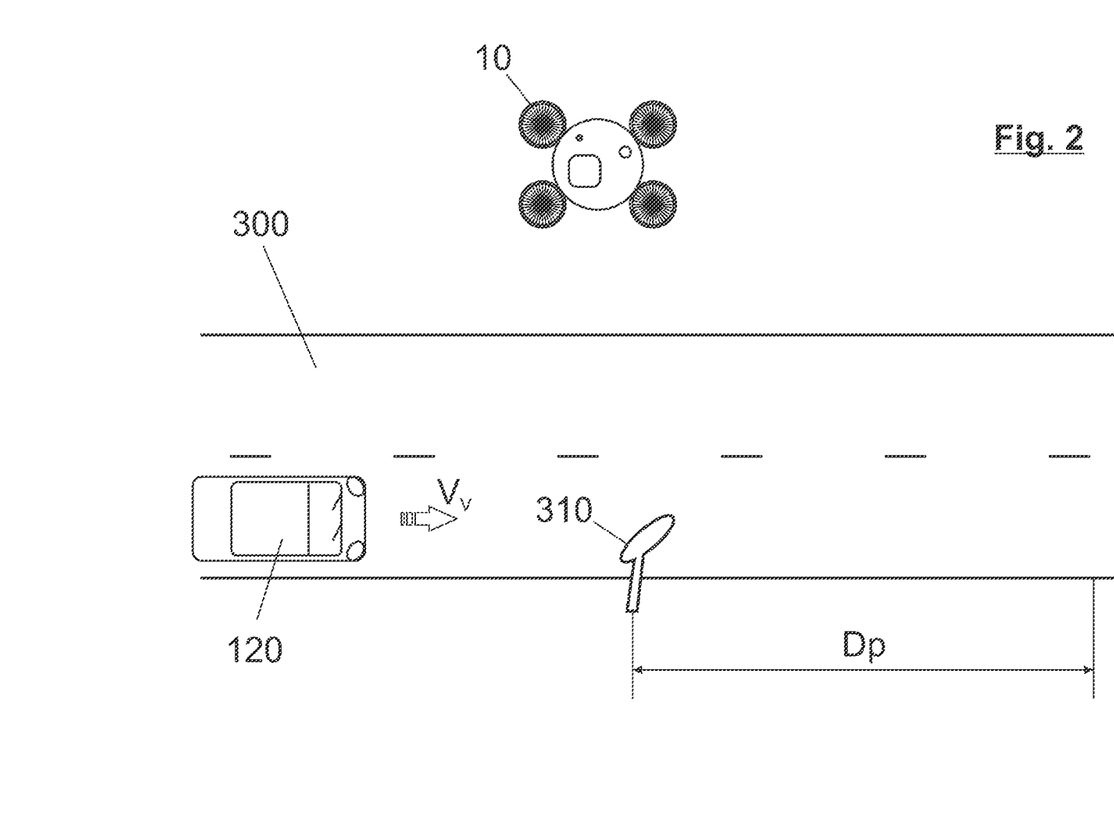
FIG. 2: presents a diagrammatic view of an unmanned aerial vehicle according to the invention monitoring a vehicle on a roadway.

The operation of the system according to the invention begins with the takeoff of the unmanned aerial vehicle (10) and the positioning of the latter in the airspace (200) above or near the roadway (300), which can be seen in an exemplary and non-limiting manner in FIG. 2.

As already described above, the location, ground speed ($V_D$) and the direction of the unmanned aerial vehicle (10) is performed by using the embedded GPS device (60) and the correlation between the position of the unmanned aerial vehicle (10) and the position of the vehicle (120) for the purpose of location determination is performed by the speed meter (30) or tracking sensor or tracking antenna.

With the information of the unmanned aerial vehicle (10) location, and, consequently, the location of the measurement (1st step), with its geographical coordinates, an embedded database (5c) of the unmanned aerial vehicle itself (10) or available on or from the base station (80) is queried for the verification of the maximum speed allowed for that roadway (300) below the position of the unmanned aerial vehicle (10) or for the roadway (300) target of monitoring on the section the vehicle (120) can be found.

When a vehicle (120) enters the measuring beam of the detector and speed meter (30), this vehicle (120) shall be monitored. At least the following data are informed by the detector and speed meter (30) to the central processing unit (50a): vehicle (120) identifier, vector of vehicle (120) speeds, and vehicle (120) position vector.

Based on the speed vector informed by the detector and speed meter (30), the information of relative speed ($V_{MED}$) at a predetermined distance is used for characterization of the infraction. If this speed is higher than the maximum limit permitted for a given location, considering the ground speed ($V_D$) and displacement trajectory of the unmanned aerial vehicle (10), one or more image/video records of this vehicle (120) are made and stored in the embedded storage device (50b).

As can be inferred from the above description, the method according to the invention considers variable a 1st step and changes substantially the 4th step of the exemplary method mentioned above, thus validating the trigger before capture (5th step) of the image.

It is worth mentioning that, as above mentioned, several combinations and additions of the steps of the exemplary method are possible, such as, for example, in the case of the 5th step, in which capture can be performed regardless of the outcome of the 4th step, proceeding to the remaining steps, transmitting said pooled data and leaving data evaluation, data re-evaluation, infraction determination, consideration of special cases, exceptions etc. for a later time (and/or over the receiver of the data).

In the same preferred embodiment of the invention, in addition to the information on maximum limit permitted for a given location, there is the verification in the embedded database (50c) of the unmanned aerial vehicle itself (10) or available in or from the base station (80), as to if the unmanned aerial vehicle (10) is in a location near a region of variation of maximum permitted speed, i.e. when the maximum permitted speed is not constant along the entire length of the roadway (300).

If it is near a region speed reduction area, for the purpose of determining the tolerance of infraction, it is important to consider the perception, reaction and braking distance (Dp) of the driver, a variable used worldwide and that takes into account the perception and reaction time of the driver, the braking distance required to secure reduction of speed and the legibility distance of the signpost (310) that indicates the new (lower) speed. Said perception, reaction and braking distance (Dp) is, therefore, a tolerance that can eventually interfere with the characterization of the maximum permitted speed for the section of the roadway and eventual characterization of the infraction in case of speeding.

The query performed to the embedded database (50c) or to a databank presents the maximum speed permitted on the section initially travelled by the vehicle (120) and the maximum speed permitted in the subsequent section. In possession of this information, it is possible to calculate the perception, reaction and braking distance (Dp) as known to the state of the art. The form of calculation and parameterization of the perception, reaction and braking distance (Dp) will depend on the relevant legislation, and can be calculated, for example, by the formula and table made available by the Brazilian Traffic Sign Manual (*Manual Brasileiro de Sinalização de Trânsito Conselho Nacional de Trânsito (Brazil)* (CONTRAN), *Sinalização vertical de regulamentação/Contran—Denatran—Brasilia: Contran*, 2006, page 43). Another calculation method is the one anticipated, for example, by *A Policy on Geometric Design of Highways and Streets*, of the American Association of State Highway Officials (AASHTO)—AASHTO, 2004, pages 117-118, or, for example, by *Recommandations techniques pour la conception générale et la géometrie de la route. Aménagement des Routes Principales* of the *Service d'Études Techniques des Routes ET Autoroutes* (SÉTRA)—SÉTRA, 1994, pages 76-77, or even by *Comprendre les Principaux Paramètres de Conception Géométrique des Routes* of the *Service d'Études Techniques des Routes ET Autoroutes* (SÉTRA)—SÉTRA, 2006, pages 6-7.

If the GPS (60) indicated the location of the unmanned aerial vehicle (10) above or near a region between the speed transition point (signpost (310)) and the distance equal to the perception, reaction and braking distance (Dp), the record of the infraction cannot be used as a proof of traffic infraction.

The verification method of perception, reaction and braking distance (Dp), aims to generate a coordinate of the roadway (300) from which a possible violation must be considered, respecting the corresponding legislation and preventing the generation of invalid records of infractions.

As can be inferred from the above description, the method according to the invention considers variable a 1st step and changes substantially the 4th step of the exemplary method mentioned above, thus validating the trigger before capture (5th step) of the image, considering the perception, reaction and braking distance (Dp) corresponding to the location.

It is worth mentioning that, as above mentioned, several combinations and additions of the steps of the exemplary method are possible, such as, for example, in the case of the 5th step, in which capture can be performed regardless of the outcome of the 4th step, proceeding to the remaining steps, transmitting said pooled data and leaving data evaluation, data re-evaluation, infraction determination, consideration of special cases, exceptions as to the perception, reaction and braking distance (Dp) etc. for a later time (and/or over the receiver of the data).

Information of ground speed ($V_D$) and of direction of the unmanned aerial vehicle (10) is used to calculate the vehicle speed ($V_V$) on the roadway (300), should the unmanned aerial vehicle (10) be in motion at the time of measurement.

As already described above, the detector and speed meter (30) of the unmanned aerial vehicle (10) according to the present invention, is a Doppler tracking sensor (tracking antenna), which detects the vehicle (120) and calculates its relative speed ($V_{MED}$) and displacement direction at a given point of the roadway (300), below the location of the unmanned aerial vehicle (10).

Figure 3:
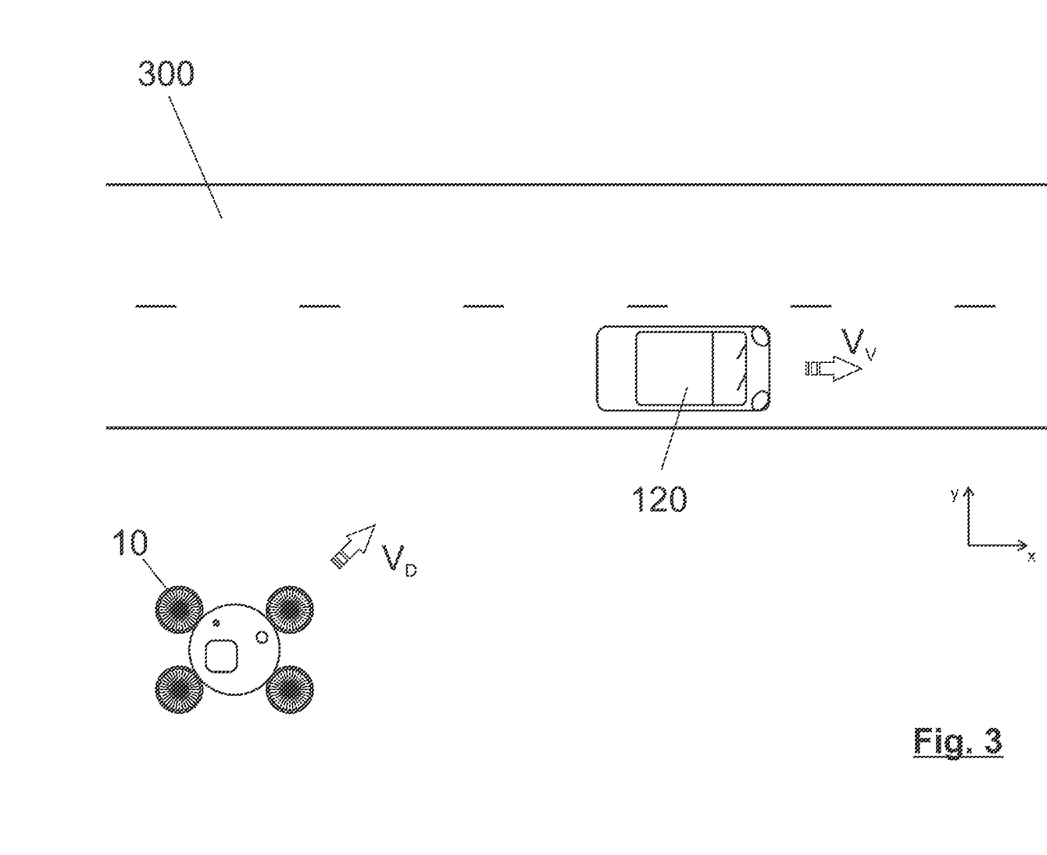
FIG. 3: presents a diagrammatic view of an unmanned aerial vehicle according to the invention monitoring a vehicle on a roadway, the unmanned aerial vehicle in an inclined direction with respect to the imaginary axis of the roadway.

FIG. 3 illustrates a hypothetical situation in which the unmanned aerial vehicle (10) has a speed ($V_D$) in an inclined direction by relative angle ($\alpha$) in relation to imaginary axes (x) and (y) of the horizontal plane in which the roadway (300) is found, while the vehicle (120) moves in the x direction with a speed ($V_v$).

Figure 4:
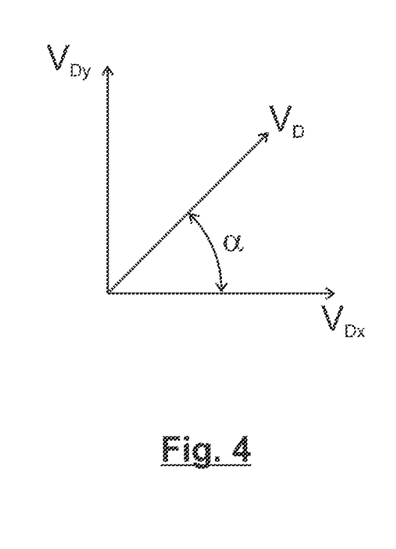
FIG. 4: presents vector decomposition of the speed of the unmanned aerial vehicle according to the invention, in an exemplary hypothetical situation.

Speed vector ($V_{Dx}$) of the unmanned aerial vehicle (10) with respect to the vehicle (120) is decomposed (see FIG. 4) to obtain the speed vector ($V_D$) of the unmanned aerial vehicle (10) in the direction of the speed vector of the vehicle ($V_V$) by the formula:

$$V_{Dx}=V_D \cdot \cos \alpha$$

If the direction of displacement of the unmanned aerial vehicle (10) and of the vehicle (120) is opposite (approximation), the vehicle speed ($V_V$) is calculated by the formula:

$$V_v=V_{MED}-V_{Dx}$$

If the direction of displacement of the unmanned aerial vehicle (10) and of the vehicle (120) is the same (separation), the vehicle speed ($V_V$) is calculated by the formula:

$$V_v=V_{MED}+V_{Dx}$$

If a vehicle (120) is detected with a speed ($V_V$) greater than the maximum permitted speed for that section of the roadway (300), the camera (s) (40) captures/capture images and/or videos which prove the infraction was committed, identifying the offending vehicle based on its license plate.

Relative angle ($\alpha$), required for the decomposition of the speed vector, can be determined by calculating the angular coefficients (m) of the lines that describe: the trajectory of the unmanned aerial vehicle (10) and the direction of the roadway. The trajectory of the unmanned aerial vehicle is given by the GPS (60), in the form of two shifting points ($x_{D1}$, $y_{D1}$ e $x_{D2}$, $y_{D2}$). The direction of the roadway is obtained by querying the embedded vectorized map, which provides two points ($x_{via1}$, $y_{via1}$ e $x_{via2}$, $y_{via2}$) of the roadway vector in the position below the unmanned aerial vehicle.

Initially, the angular coefficient of the unmanned aerial vehicle trajectory ($m_D$) and the angular coefficient of the roadway direction ($m_{via}$) are calculated by the formulas:

$$m_D=(y_{D2}-y_{D1})/(x_{D2}-x_{D1})$$

$$m_{via}=(y_{via2}-y_{via1})/(x_{via2}-x_{via1})$$

Then, angle $\alpha$ is calculated by the formula:

$$\alpha=\tan^{-1}\{|(m_D-m_{via})/(1+m_D \cdot m_{via})|\}$$

It is to be noted that, despite the calculation form above, it is possible that relative angle ($\alpha$) is calculated by simple subtraction of angles, if the orientation of the roadway orientation (e.g., 30° NE) is available in the embedded map to be used, and GPS offers the option of electronic compass.

After the capture of images and/or videos of the offending vehicle (120), those are transmitted between signal transmission and reception devices (70, 110) of the unmanned aerial vehicle (10), the base station (80), where they are stored in storage device of images and/or video (100) for further processing and issuance of records of a traffic violation by the traffic authority.

As can be inferred from the above description, the method according to the invention considers variable the 1st step and changes substantially the 3rd step of the exemplary method mentioned above.

It is worth recalling that, as already described above, several combinations and additions of the steps in the method are possible such as in the case of the 3rd step, in which there can be speed compensation for the next step of comparison (4th step) and determination of the trigger.

It is also possible to conceive, regardless of the outcome of the 4th step, proceeding to the remaining steps, transmitting said pooled data and leaving speed compensation, data evaluation, data re-evaluation, consideration of special cases, exceptions etc. for a later time (and/or over the receiver of the data).

CONCLUSION

Those skilled in the art will easily understand that modifications can be made to the present invention without straying from the concepts exposed in the above description. These modifications are to be considered comprised by the scope of the present invention. Consequently, the particular embodiments previously described in detail are only illustrative and exemplary as well as non-restrictive with regards to the scope of the present invention, to which the full extent of the appended claims and of each and every equivalent should be given.

The invention claimed is:

1. TRAFFIC MONITORING AND SURVEILLANCE AND TRAFFIC INFRACTION RECORDING SYSTEM, particularly for monitoring and surveillance of one or more vehicles (120) moving on one or more roadways (300) and detection and recording of image and/or video of speeding infractions by vehicles (120) moving on the roadway (300), said system comprising an unmanned aerial vehicle (10) and a base station (80) wherein said system performs a query to a database embedded in the unmanned aerial vehicle (10) itself or available in the base station (80) to:
  verify, update and validate the maximum permitted speed for the roadway (300) below the current position of the unmanned aerial vehicle (10) or for the roadway (300) target of monitoring; and
  verify if the unmanned aerial vehicle (10) is in a location near a section having a variation of the maximum permitted speed,
  wherein once the position of the unmanned aerial vehicle (10) in a location near a section having a variation of the maximum permitted speed is verified, the system generates a coordinate of the roadway (300) equivalent to the perception, reaction and braking distance (Dp) from which a possible speeding infraction of a vehicle (120) must be considered.

2. The SYSTEM, according to claim 1, wherein the system performs verification of location, ground speed ($V_D$) and direction of the unmanned aerial vehicle (10) and the subsequent compensation (decrease or increase) of the speed of the vehicle ($V_V$) with respect to the speed of the unmanned aerial vehicle (10).

3. The SYSTEM, according to claim 2, wherein the vehicle is an unmanned aerial vehicle (10).

4. The SYSTEM, according to claim 1, wherein the unmanned aerial vehicle (10) is operated in airspace (200) above a roadway (300).

5. The SYSTEM, according to claim 1, wherein the base station (80) is on the ground (300) or over/on a vehicle.

6. The SYSTEM, according to claim 1, wherein the unmanned aerial vehicle (10) is provided with one or more self-propelled devices (20), at least one detector and speed meter (30), one or more cameras (40), a central processing unit (50), at least one device provided with a global positioning system or GPS (60) and at least one signal transmission and reception device (70).

7. The SYSTEM, according to claim 6, wherein the embedded central unit (50) is provided with a central processing unit or CPU (50a), an embedded storage device (50b), and configured to be provided with an embedded database (50c) and an embedded map (50d).

8. The SYSTEM, according to claim 1, wherein the base station (80) is provided with at least one control module (90), at least one storage device of images and/or video (100) and at least one signal transmission and reception device (110).

9. TRAFFIC MONITORING AND SURVEILLANCE AND TRAFFIC INFRACTION RECORDING METHOD, particularly for monitoring and surveillance of one or more vehicles (120) moving on one or more roadways (300) and detection and recording of image and/or video of speeding infractions by vehicles (120) moving on the roadway (300) by means of the steps of localization, detection, measurement, comparison, capture, storage and transmission of collected data wherein said method additionally comprises a step of querying an embedded database (50c) of the unmanned aerial vehicle (10) itself or available in or from the base station (80) to:
  verify, update and validate the maximum permitted speed for the roadway (300) below the current position of the unmanned aerial vehicle (10) or for the roadway (300) target of monitoring; and
  verify if the unmanned aerial vehicle (10) is in a location near a section having a variation of the maximum permitted speed,
  wherein once the position of the unmanned aerial vehicle (10) in a location near a section having a variation of the maximum permitted speed is verified, said method further comprises generating a coordinate of the roadway (300) equivalent to the perception, reaction and braking distance (Dp) from which a possible speeding infraction of a vehicle (120) must be considered.

10. The METHOD, according to claim 9, wherein the method further comprises verifying location, ground speed ($V_D$) and direction of the unmanned aerial vehicle (10) and the subsequent compensation (decrease or increase) of the speed of the vehicle ($V_V$) with respect to the speed of the unmanned aerial vehicle (10).

11. The METHOD, according to claim 10, wherein the compensation (decrease or increase) of the vehicle speed ($V_V$) with respect to the speed of the unmanned aerial vehicle (10) is performed on the measurement step.

12. The METHOD, according to claim 10, wherein the compensation (decrease or increase) of the vehicle speed ($V_V$) with respect to the speed of the unmanned aerial vehicle (10) is performed on the comparison step.

13. The METHOD, according to claim 10, wherein the compensation (decrease or increase) of the vehicle speed ($V_V$) with respect to the speed of the unmanned aerial vehicle (10) is performed regardless of the outcome of the comparison step.

14. The METHOD, according to claim 9, wherein the capture step and the remaining subsequent steps are performed regardless of the outcome of the comparison step.

* * * * *